(12) United States Patent
Singh et al.

(10) Patent No.: US 9,758,602 B2
(45) Date of Patent: Sep. 12, 2017

(54) CATALYST FOR OLEFIN POLYMERIZATION AND POLYMERIZATION THEREOF

(71) Applicant: INDIAN OIL CORPORATION LIMITED, Mumbai (IN)

(72) Inventors: Gurmeet Singh, Faridabad (IN); Naresh Kumar, Faridabad (IN); Bhasker Bantu, Faridabad (IN); Sukhdeep Kaur, Faridabad (IN); Rashmi Rani, Faridabad (IN); Mohasin Momin, Faridabad (IN); Gurpreet Singh Kapur, Faridabad (IN); Shashikant, Faridabad (IN); Biswajit Basu, Faridabad (IN); Ravinder Kumar Malhotra, Faridabad (IN)

(73) Assignee: INDIAN OIL CORPORATION LIMITED, Mumbai (IN)

(*) Notice: Subject to any disclaimer, the term of this patent is extended or adjusted under 35 U.S.C. 154(b) by 0 days.

(21) Appl. No.: 15/051,459

(22) Filed: Feb. 23, 2016

(65) Prior Publication Data
US 2016/0244537 A1   Aug. 25, 2016

(30) Foreign Application Priority Data
Feb. 23, 2015   (IN) ............................ 591/MUM/2015

(51) Int. Cl.
*C08F 10/02*   (2006.01)

(52) U.S. Cl.
CPC ................................... *C08F 10/02* (2013.01)

(58) Field of Classification Search
None
See application file for complete search history.

(56) References Cited

U.S. PATENT DOCUMENTS

| | | | |
|---|---|---|---|
| 4,314,912 A † | 2/1982 | Lowery | |
| 4,859,749 A | 8/1989 | Franke | |
| 5,260,245 A | 11/1993 | Mink et al. | |
| 5,623,033 A * | 4/1997 | Kioka | C08F 10/00 526/124.6 |
| 6,803,338 B1 | 10/2004 | Yang et al. | |

FOREIGN PATENT DOCUMENTS

| CN | 104974283 A | 10/2015 |
|---|---|---|
| WO | 2014/045259 A2 | 3/2014 |

OTHER PUBLICATIONS

Cecchin et al., Ziegler-Natta Catalysts, Kirk-Othmer Encyclopedia of Chemical Technology, John Wiley and Sons, Feb. 14, 2003, pp. 502-554.†

\* cited by examiner
† cited by third party

*Primary Examiner* — Catherine S Branch
(74) *Attorney, Agent, or Firm* — Maschoff Brennan

(57) ABSTRACT

The present invention describes a process for preparing catalyst for the polymerization of ethylene consisting essentially of the steps of (i) contacting a magnesium based precursor with a solvent; and (ii) then contacting the magnesium based precursor in the solvent with a transition metal compound to obtain the catalyst, wherein step (ii) is single contact step. The present invention also relates to a process for preparation of a catalyst system and a process of polymerizing and/or copolymerizing of ethylene to obtain a polyethylene using the catalyst.

11 Claims, 1 Drawing Sheet

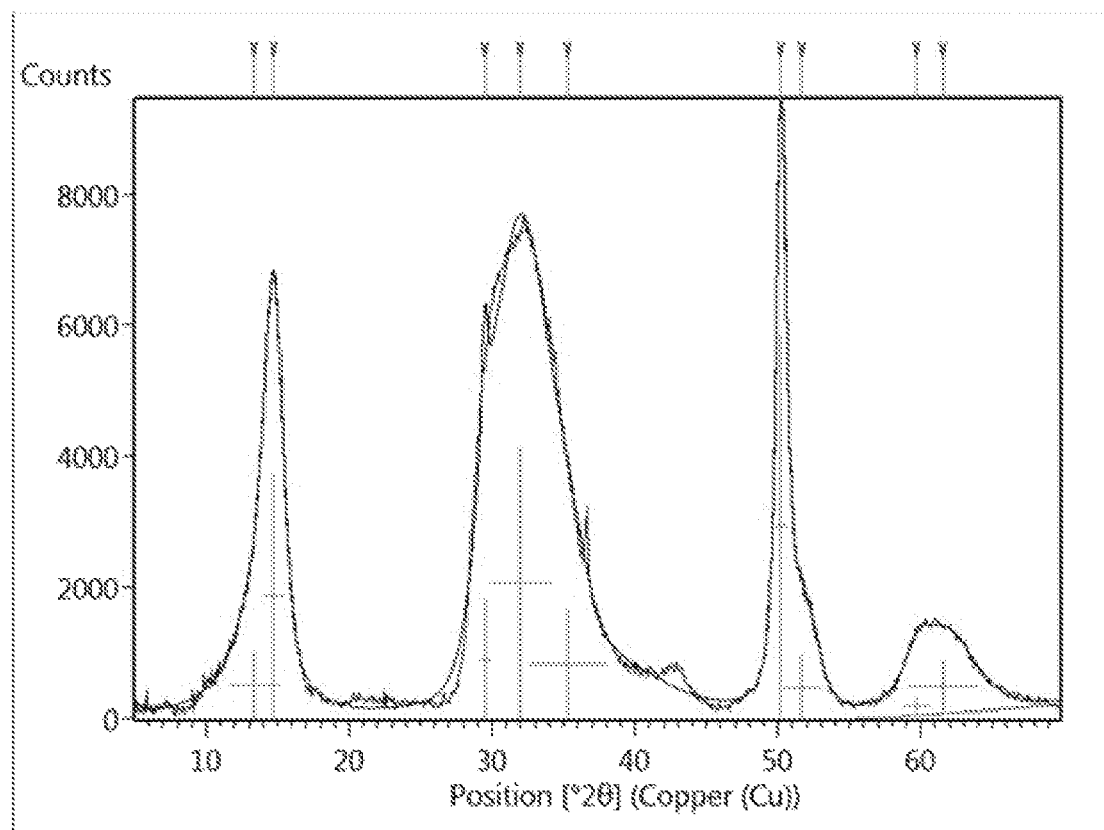

CATALYST FOR OLEFIN POLYMERIZATION AND POLYMERIZATION THEREOF

FIELD OF THE INVENTION

The present invention relates to a process for preparing catalyst using magnesium based precursor along with transition metal for the polymerization of ethylene.

BACKGROUND OF THE INVENTION

Ziegler-Natta catalyst systems are well known for their capability to polymerize olefins. They in general consist of a support which mostly is magnesium based onto which titanium component has been added along with organic compound known as internal donor. This catalyst when combined with co-catalyst and/or external donor comprise of the complete ZN catalyst system. Various internal donors are incorporated during catalyst synthesis to enhance specific properties of the polyethylene catalyst. Internal donors like tetrahydrofuran, ethyl benzoate, tetraethoxysilane, dimethylformamide etc are well known commercially used in polyethylene catalyst.

U.S. Pat. No. 4,859,749 describes two-stage polymerization process using a modified supported catalyst for ethylene polymers. The supported catalyst used is formed by reaction of a magnesium alcoholate with a titanium-IV compound in suspension and subsequent reaction with a halogen-containing organoaluminum compound and activation of the solid thus obtained by an aluminum trialkyl or aluminum isoprenyl. This catalyst has the disadvantage of generating higher amount of undesirable side products which act as either poison and hence lowers the catalyst activity or generate low molecular weight polyethylene which leads to fouling.

U.S. Pat. No. 5,260,245 describes a catalyst for producing higher flow index linear low density polyethylene with relatively narrower molecular weight distributions using catalyst which is formed by treating silica having reactive OH groups with a dialkylmagnesium in a solvent. Then adding to said solvent a carbonyl containing compound to form an intermediate which is subsequently treated with a transition metal to form a catalyst precursor. The catalyst precursor is activated with triethylaluminum. This invention relates to the in-situ generation of internal donor due to the addition of carbonyl compound.

CN 104974283 describes the catalyst component obtained by loading magnesium/titanium-containing solid with at least one inorganic titanium compound, at least one organic titanium compound, at least one electron donor compound and at least one activator. The magnesium titanium-containing solid is prepared by the following method: dissolving magnesium compound in a solvent system comprising organic epoxy compound and organophosphorus compound to form a homogeneous solution, and co-precititating with titanium compound and one or more organic ester compound in the presence of composite co-precipitant. The catalyst component has relatively narrow particle size distribution and small ay. particle size. The catalyst has high activity and high hydrogen response, and can get polymer with low fines content. This invention also describes the usage of organic ester as internal donor to improve catalyst property.

U.S. Pat. No. 6,803,338 describes the solid titanium catalyst used for homo- and co-polymerization of ethylene, having excellent in catalytic activity and producing polymers with a high bulk density and less polymer soluble in the medium. The solid titanium catalyst is produced by Step (i) producing a magnesium solution by contact-reacting a halogenated magnesium compound and alcohol, Step (ii) reacting the solution with a phosphorus compound and an ester compound having at least one hydroxy group, and Step (iii) adding thereto a mixture of a titanium compound and a silicon compound.

Hence, there is always a need of better catalyst as well as polymerization processes which give better performance in cost effective manner.

SUMMARY OF THE INVENTION

Accordingly, the present invention provides a process for preparing catalyst for polymerization of ethylene using magnesium based precursor along with transition metal. The said catalyst is prepared using single contact with transition metal compound and no internal donor is added during the preparation. The amount of transition metal compound used in the present invention is lower than the amount which is generally used for the polyethylene catalyst synthesis. The said catalyst is highly active for ethylene polymerization and exhibits excellent hydrogen response with improved hexane soluble due to negligible production of side/by products.

Accordingly, the present invention provides a process for preparing catalyst for the polymerization of ethylene consisting essentially of the steps of:
(i) contacting a magnesium based precursor with a solvent; and
(ii) then contacting the magnesium based precursor in the solvent with a transition metal compound to obtain the catalyst,
wherein step (ii) is single contact step.

In an embodiment of the present invention, the solvent is aromatic or aliphatic and polar or non polar in nature, and is selected from group comprising of benzene, decane, kerosene, ethyl benzene, chlorobenzene, dichlorobenzene, toluene, o-chlorotoluene, xylene, dichloromethane, chloroform, cyclohexane and combination thereof.

In one of the embodiment of the present invention the contact time with the solvent in step (i) is immediate to 5 h.

In yet another embodiment of the present invention, the contact temperature with the solvent in step (i) is from 10° C. to 200° C.

In another embodiment of the present invention, the magnesium based precursor contains magnesium which is liquid or solid in nature.

In yet another embodiment of the present invention, the magnesium based precursor is liquid in nature and prepared by contacting magnesium source with organohalide and alcohol in presence of the solvent in a single step.

In another embodiment of the present invention, the magnesium based precursor is solid in nature and is prepared by first contacting the magnesium source with organohalide in presence of solvating agent as the first step and then followed by addition of alcohol.

In one embodiment of the present invention, the magnesium based precursor is contacted with solvent prior to transition metal contact.

In yet another embodiment of the present invention, the transition metal compound is represented by $M(OR)_p X_{4-p}$, where M is selected from a group comprising of Ti, V, Zr, and Hf,; X is a halogen atom; R is a hydrocarbon group and p is an integer having value equal or less than 4, the transition metal compound is selected from a group comprising of transition metal tetrahalide, alkoxy transition metal trihalide/aryloxy transition metal trihalide, dialkoxy transition metal dihalide, trialkoxy transition metal monohalide, tetraalkoxy transition metal, and mixtures thereof; wherein:

(a) the transition metal tetrahalide is selected from a group comprising of titanium tetrachloride, titanium tetrabromide and titanium tetraiodide and the likes for V, Zr and Hf;
(b) alkoxy transition metal trihalide/aryloxy transition metal trihalide is selected from a group comprising of methoxytitanium trichloride, ethoxytitanium trichloride, butoxytitanium trichloride and phenoxytitanium trichloride and the likes for V, Zr and Hf;
(c) dialkoxy transition metal dihalide is diethoxy titanium dichloride and the likes for V, Zr and Hf;
(d) trialkoxy transition metal monohalide is triethoxy titanium chloride and the likes for V, Zr and Hf; and
(e) tetraalkoxy transition metal is selected from a group comprising of tetrabutoxy titanium and tetraethoxy titanium and the likes for V, Zr and Hf.

In yet another embodiment of the present invention, the contact temperature with the transition metal compound in step (ii) is between −50° C. and 150° C.

In yet another embodiment of the present invention, the titanium compound is added in amounts ranging from 1 to 20 moles with respect to one mole of magnesium.

In yet another embodiment of the present invention, the transition metal compound is used either neat or in solvent and wherein the solvent is selected from a group comprising of chlorinated aromatic hydrocarbon, non chlorinated aromatic hydrocarbon, chlorinated aliphatic hydrocarbon, non chlorinated aliphatic hydrocarbon and combination thereof.

In yet another embodiment of the present invention, the solvent comprises from 40 to 60 volume percent and selected from a group comprising of benzene, decane, kerosene, ethyl benzene, chlorobenzene, dichlorobenzene, toluene, o-chlorotoluene, xylene, dichloromethane, chloroform, cyclohexane and combination thereof.

In yet another embodiment of the present invention, the contact temperature with the transition metal compound in step (ii) is between −50° C. and 150° C. and heating is instigated at a rate of 0.1 to 10.0° C./minute.

The present invention also provides a catalyst comprising 1.0 wt % to 14 wt % of titanium and 10 wt % to 20 wt % of magnesium.

The present invention also provides a process for preparation of a catalyst system, said process comprising contacting the catalyst with at least one cocatalyst, and optionally with an external electron donor to obtain the catalyst system.

The present invention also provides a process of polymerizing and/or copolymerizing of ethylene to obtain a polyethylene said process comprising the step of contacting an ethylene under a polymerizing condition with the catalyst system.

BRIEF DESCRIPTION OF DRAWING

FIG. 1: XRD of the catalyst of the present invention.

DETAILED DESCRIPTION OF THE INVENTION

The present invention discloses the process of preparation of catalyst for the polymerization of ethylene where the magnesium based precursor is contacted with transition metal. The said catalyst is able to polymerize olefins with high activity and excellent hydrogen response.

The present invention describes the process of preparation of catalyst. In an embodiment, the solid catalyst is prepared through the process which requires contacting magnesium based precursor with transition metal. In another embodiment, the magnesium based precursor used in the present invention is prepared through the process as described in WO2014/045260 and WO2014/045259.

According to the present invention, the magnesium based precursor contains magnesium and may be liquid or solid in nature. In an embodiment, the magnesium based precursor is liquid in nature and prepared by contacting magnesium source with organohalide and alcohol in presence of the solvent in a single step.

In an embodiment, the magnesium based precursor is solid in nature and is prepared by first contacting the magnesium source with organohalide in presence of solvating agent as the first step and then followed by addition of alcohol. The solid magnesium based precursor is obtained either by removal of solvating agent or by precipitation methodology.

The present invention describes the process of preparation of catalyst. The solid catalyst is prepared through the process which requires contacting magnesium based precursor with transition metal in presence of solvent. In an embodiment, the magnesium based precursor is contacted with solvent prior to transition metal contact. In another embodiment, the solvent can be aromatic or aliphatic and polar or non polar in nature, examples not limiting to benzene, decane, kerosene, ethyl benzene, chlorobenzene, dichlorobenzene, toluene, o-chlorotoluene, xylene, dichloromethane, chloroform, cyclohexane etc. In another embodiment, the contact time with the solvent is immediate to 5 h. In one of the preferred embodiment the contact time with the solvent is immediate to 1 h. In one of the more preferred embodiment the contact time with the solvent is immediate to 0.5 h. In another embodiment, the contact temperature is from 10° C. to 200° C. In one of the preferred embodiment, the contact temperature is from 20° C. to 120° C.

The magnesium based precursor is contacted with the solvent where either the precursor can be added to the solvent or solvent can be added to the precursor.

The present invention describes the process of preparation of catalyst. In an embodiment, the magnesium based precursor in the solvent is treated with transition metal selected from compounds represented by $M(OR)_p X_{4-p}$, where M is a transition metal and is selected from a group comprising of Ti, V, Zr, and Hf, preferably Ti; X is a halogen atom; R is a hydrocarbon group and p is an integer having value equal or less than 4. In yet another embodiment of the present invention, the transition metal compound represented by $M(OR)_p X_{4-p}$ is selected from a group comprising of transition metal tetrahalide, alkoxy transition metal trihalide/aryloxy transition metal trihalide, dialkoxy transition metal dihalide, trialkoxy transition metal monohalide, tetraalkoxy transition metal, and mixtures thereof; wherein:

(a) the transition metal tetrahalide is selected from a group comprising of titanium tetrachloride, titanium tetrabromide and titanium tetraiodide and the likes for V, Zr and Hf;
(b) alkoxy transition metal trihalide/aryloxy transition metal trihalide is selected from a group comprising of methoxytitanium trichloride, ethoxytitanium trichloride, butoxytitanium trichloride and phenoxytitanium trichloride and the likes for V, Zr and Hf;
(c) dialkoxy transition metal dihalide is diethoxy titanium dichloride and the likes for V, Zr and Hf;

(d) trialkoxy transition metal monohalide is triethoxy titanium chloride and the likes for V, Zr and Hf; and
(e) tetraalkoxy transition metal is selected from a group comprising of tetrabutoxy titanium and tetraethoxy titanium and the likes for V, Zr and Hf.

The contact temperature with the transition metal compound is between about −50° C. and about 150° C. In one of the preferred embodiment, the contact temperature with the transition metal compound is between about −30° C. and about 120° C.

A person skilled in the present art knows that the titanium to magnesium mole ratios used for catalyst synthesis are about 20 to 80 moles. In an embodiment, the titanium compound is added in amounts ranging from about at least 1 to 20 moles, with respect to one mole of magnesium. In one of the preferred embodiment, the titanium compound is added in amounts ranging from about at least 5 to 15 moles, with respect to one mole of magnesium. However usage of higher titanium compound is neither advantageous nor detrimental to catalyst synthesis process.

A person skilled in the present art knows that the contact of the magnesium based precursor with transition metal compound is generally twice or more. In an embodiment, the contact of the magnesium based precursor with transition metal compound in presence of the solvent is single. However multiple contact with transition metal compound is neither advantageous nor detrimental to catalyst synthesis process.

In an embodiment, the transition metal compound can be used either neat or in solvent which can be chlorinated or non chlorinated aromatic or aliphatic in nature, examples not limiting to benzene, decane, kerosene, ethyl benzene, chlorobenzene, dichlorobenzene, toluene, o-chlorotoluene, xylene, dichloromethane, chloroform, cyclohexane and the like, comprising from 40 to 60 volume percent. In another embodiment, this treatment is either one shot or dropwise or controlled.

In a preferred embodiment, this reaction system is gradually heated to the temperature effective to carry out the reaction, preferably from about −50° C. and about 150° C. In one of the more preferred embodiment, reaction system is gradually heated to the temperature effective to carry out the reaction from about −30° C. and about 120° C. The heating is instigated at a rate of 0.1 to 10.0° C./minute, or at a rate of 1 to 5.0° C./minute. The resultant is the solid component in the solvent comprising of magnesium, transition metal and halogen components.

The resulting solid component comprising of magnesium, transition metal and halogen can be separated from the reaction mixture either by filtration or decantation and washed with solvent to remove unreacted component and other side products. In an embodiment, the resultant solid component is washed one or more time with chlorinated or non chlorinated aromatic or aliphatic solvent, examples not limiting to benzene, decane, kerosene, ethyl benzene, chlorobenzene, dichlorobenzene, toluene, o-chlorotoluene, xylene at temperature from about 80° C. to about 120° C.

The solid catalyst is separated from the above solvent either by filtration or decantation and finally washed with inert solvent to remove unreacted component and other side products. Usually, the resultant solid material is washed one or more times with inert solvent which is typically a hydrocarbon including, not limiting to aliphatic hydrocarbon like isopentane, isooctane, hexane, pentane or isohexane. In an embodiment, the resulting solid mixture is washed one or more times with inert hydrocarbon based solvent preferably, hexane at temperature from about 20° C. to about 80° C. In one of the more preferred embodiment, the resulting solid mixture is washed at temperature from about 25° C. to about 70° C. The solid catalyst can be separated and dried or slurried in a hydrocarbon specifically heavy hydrocarbon such as mineral oil for further storage or use.

In an embodiment, the catalyst includes from about 1.0 wt % to 14 wt % of titanium and magnesium is from about 10 wt % to 20 wt %.

The catalyst synthesis process as described in the present invention is a simple process where harsh chemicals based on transition metals are used in relatively lesser amount. It is also the advantage of this process that it doesn't require higher temperatures and longer time periods for catalyst synthesis.

XRD measurement of representative catalyst which is synthesized from the process described in present invention provided following features: 1) 9-18°: broad peak, 2) 27-38°: broad peak, 3) 43° broad halo, 4) 48-54°: broad peak, and 5) 57-67°: broad halo. The broad peaks & halo emerge due to the distortion in the $MgCl_2$ structure attributed to the changes in the regular arrangement of Cl—Mg—Cl triple layers in $MgCl_2$ providing desired active/disordered $MgCl_2$ required for high activity catalysts. Deconvolution of XRD enabled the calculation of crystallite size which falls in the range of 5-15 nm. FIG. 1 shows the XRD data of the said catalyst of the present invention.

The present invention provides the catalyst system for polymerization and/or copolymerization of ethylene. In the embodiment, the method of polymerization process is provided where the catalyst system is contacted with ethylene typically in the presence of hydrogen, under polymerization conditions. The catalyst system includes the said catalyst, organoaluminum compounds and/or external electron donors. The co-catalyst may include hydrides, organoaluminum, lithium, zinc, tin, cadmium, beryllium, magnesium, and combinations thereof. In an embodiment, the preferred co-catalyst is organoaluminum compounds.

In an embodiment, the organoaluminum compounds include, not limiting to, alkylaluminums such as trialkylaluminum such as preferably triethylaluminum, triisopropylaluminum, triisobutylaluminum, tri-n-butylaluminum, tri-n-hexylaluminum, tri-n-octylaluminum; trialkenylaluminums such as triisoprenyl aluminum; dialkylaluminum halides such as diethylaluminum chloride, dibutylaluminum chloride, diisobutylaluminum chloride and diethyl aluminum bromide; alkylaluminum sesquihalides such as ethylaluminum sesquichloride, butylaluminum sesquichloride and ethyl aluminum sesquibromide; dialkyl aluminum hydrides such as diethylaluminum hydride and dibutylaluminum hydride; partially hydrogenated alkylaluminum such as ethylaluminum dihydride and propylaluminum dihydride and aluminoxane such as methylaluminoxane, isobutylaluminoxane, tetraethylaluminoxane and tetraisobutylaluminoxane; di ethyl aluminum ethoxide.

The mole ratio of aluminum to titanium is from about 5:1 to about 500:1. In one of the preferred embodiment, the mole ratio of aluminum to titanium is from about 10:1 to about 250:1. In one of the most preferred embodiment, the mole ratio of aluminum to titanium is from about 25:1 to about 100:1.

In one embodiment, the ethylene is polymerized under mild conditions in an inert hydrocarbon medium. In another embodiment, inert hydrocarbon medium include aliphatic hydrocarbons such as propane, butane, isobutane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene, liquid olefins and mixtures thereof.

The catalyst system is contacted with olefin under polymerization conditions to produce desired polymer products. The polymerization process can be carried out such as by slurry polymerization using an inert hydrocarbon solvent as a diluent, or bulk polymerization using the liquid monomer as a reaction medium and in gas-phase operating in one or more fluidized or mechanically agitated bed reactors. In an embodiment, polymerization is carried out as such. In another embodiment, the copolymerization is carried out using at least two polymerization zones. In particular, said catalyst can be used to produce, the following products such as high-density polyethylene (HDPE, having a density higher than 0.940 g/cm$^3$), which includes ethylene homopolymer and copolymer of ethylene and α-olefins having 3 to 12 carbon atoms; linear low-density polyethylene (LLDPE, having a density lower than 0.940 g/cm$^3$), and very low density and ultra low density polyethylene (VLDPE and ULDPE, having a density lower than 0.920 g/cm$^3$, and as low as 0.880 g/cm$^3$), consisting of the copolymer of ethylene and one or more α-olefins having 3 to 12 carbon atoms, wherein the molar content of the unit derived from ethylene is higher than 80%; elastomeric copolymer of ethylene and propylene, and elastomeric terpolymers of ethylene, propylene and butene-1 as well as diolefins at a small ratio, wherein the weight content of the unit derived from ethylene is between about 30% and 70%.

The polymerization is carried out at a temperature from 0 to 250° C., preferably from 20 to 200° C. When the polymerization is carried out in gas phase, operation pressure is usually in the range of from 5 to 100 bar preferably from 10 to 50 bar. The operation pressure in slurry polymerization is usually in the range of from 1 to 10 bar, preferably from 2 to 7 bar. The operation pressure in solution polymerization is usually in the range of from 1 to 10 bar, preferably from 2 to 7 bar. Hydrogen can be used to control the molecular weight of polymers.

The catalyst described in the present invention provides polyethylene with narrow particle size distribution, excellent bulk density and broad molecular weight distribution.

In the present invention, the described catalyst can be directly added to the reactor for polymerization or can be prepolymerized i.e. catalyst is subjected to a polymerization at lower conversion extent before being added to polymerization reactor. Prepolymerization can be performed with ethylene where the conversion is controlled in the range from 0.2 to 500 gram polymer per gram catalyst.

In the present invention, the inventors surprisingly found that the described catalyst shows excellent hydrogen response even in the absence of internal donor and/or external donor with broad molecular weight distributions.

In an embodiment, the polyethylenes produced by the said described catalyst have melt flow indexes (MI, measured according to ASTM standard D 1238)) from about 0.001 to about 3,000 dg/min, preferably from about 0.005 to about 1,000 dg/min, more preferably, from about 0.02 to about 10 dg/min.

The melt flow ratio (MFR) or $I_{21.6}/I_{2.16}$ is determined by ASTM standard D1238 where $I_{21.6}$ is a melt index of the polymer measure at 190° C. under a load of 21.6 kg and $I_{2.16}$ is a melt index of the polymer measure at 190° C. under a load of 2.16 kg. Higher MFR indicates a broad molecular weight distribution. In another embodiment, the polyethylenes produced by the said described catalyst show higher MFR.

The present invention provides the catalyst system. The catalysts system when polymerizes ethylene provides polyethylene having bulk densities (BD) of at least about 0.35 cc/g.

Having described the basic aspects of the present invention, the following non-limiting examples illustrate specific embodiment thereof.

A-Magnesium Based Precursor Synthesis

EXAMPLE 1

Liquid Magnesium Based Precursor

In 500 ml glass reactor maintained at 25 ° C., calculated amount of magnesium (powder or turnings) were weighed and added into the reactor followed by addition of calculated amount of organohalide followed by alcohol in toluene. This mixture was stirred and gradually heated to 90° C.±3. After the activation of the reaction, the mixture was allowed to be maintained at same temperature for 6 h. The resulting solution was viscous in nature. The organomagnesium compounds synthesized by the above procedure have been tabulated in Table 1.

TABLE 1

| | Liquid Precursor | | | | | |
|---|---|---|---|---|---|---|
| Precursor | Mg Ratio | Benzyl chloride Ratio | Alcohol Ratio | Solvent | Alcohol | Mg (wt %) |
| MGP#PM-018 | 1 | 1.1 | 1.2 | toluene | 2-ethyl-1-hexanol | 1.1 |

EXAMPLE 2

Solid Magnesium Based Precursor

In 500 ml glass reactor maintained at 0° C., calculated amount of magnesium (powder or turnings) were weighed and added into the reactor followed by addition of calculated amount of organohalide followed by diethyl ether. This mixture was stirred and after the activation of the reaction, the mixture was allowed to be maintained at same temperature until all magnesium has reacted. To the resulting solution, the calculated amount of alcohol was added dropwise over a period of 1-2 h. After the completion of addition, the solution was allowed to stir for another 0.5 h. Finally, ether was evaporated and solid compound was analyzed. In case of precipitation methodology, the resulting solution prepared using magnesium and organohalide in diethyl ether was precipitated out in the desired amount of alcohol/hexane mixture.

TABLE 2

Solid magnesium based precursor

| Precursor | Mg Ratio | Benzyl chloride Ratio | Alcohol Ratio | Solvent | Alcohol | Mg (wt %) | Cl (wt %) |
|---|---|---|---|---|---|---|---|
| MGP#106 | 1 | 1 | 1.1 | diethylether | ethanol | 17.1 | 30.1 |
| MGP#169 | 1 | 1 | 1.2 | diethylether | Isobutanol | 14.2 | 23.6 |
| MGP#172 | 1 | 1 | 1.2 | diethylether | 2-ethyl-1-hexanol | 12.0 | 18.1 |
| MGP#175 | 1 | 1 | 1.2 | diethylether | ethanol | 17.5 | 30.3 |
| MGP#176 | 1 | 1 | 1.2 | diethylether | ethanol | 17.6 | 30.5 |
| MGP#PM-007 | 1 | 1 | 1.2 | diethylether | ethanol | 16.9 | 29.4 |

B-Catalyst Synthesis

Into a three neck 500 ml jacketed reactor, added weighed amount of magnesium based precursor and 100 ml of dry chlorobenzene and stirred for 10-15 min at 40° C. To this added 60 ml of neat $TiCl_4$ and temperature was increased from 40° C. to 110° C. This mixture was heated to 110° C. for 2 h. The mixture was allowed to settle followed by decantation. The solid component was washed with chlorobenzene at 110° C. and allowed to settle again, followed by decantation. The solid component was washed with hexane four times at 65° C. and dried under nitrogen till free flowing powder was obtained.

TABLE 3

Catalyst synthesis

| Cat No | MGP# | Solvent for Dispersion | Titanation | Mg wt % | Ti wt % | D50 |
|---|---|---|---|---|---|---|
| PEC#31 | MGP#106 | chlorobenzene | 2 h @ 110° C. | 16.8 | 7.5 | 10.5 |
| PEC#113 | MGP#175 (4.6 g) | chlorobenzene | 1 h @ 110° C. | 15.2 | 5.9 | 10.3 |
| PEC#114 | MGP#175 (4.4 g) | chlorobenzene | 4 h @ 110° C. | 19.0 | 7.0 | 11.0 |
| PEC#115 | MGP#175 (4.5 g) | chlorobenzene | 2 h @ 110° C. | 15.7 | 5.8 | 10.7 |
| PEC#116 | MGP#175 (4.5 g) | chlorobenzene | 2 h @ 110° C. 30 ml $TiCl_4$ | 14.5 | 6.6 | 11.5 |
| PEC#117 | MGP#176 (4.6 g) | chlorobenzene | 2 h @ 110° C. | 19.5 | 6.2 | 16.3 |
| PEC#118 | MGP#175 (4.5 g) Benzoyl chloride addition | chlorobenzene; | 2 h @ 110° C. | 16.7 | 1.4 | 11.1 |
| PEC#119 | MGP#175 (5.7 g) | chlorobenzene | 2 h @ 110° C. | 17.4 | 6.4 | 10.0 |
| PEC#122 | MGP#169 (4.5 g) | chlorobenzene | 2 h @ 110° C. | 15.6 | 8.8 | 35.6 |
| PEC#109 | MGP#172 (15.6 g) | chlorobenzene | 2 h @ 110° C. | 13.0 | 7.8 | 26.2 |
| PEC#123 | MGP#169 (4.5 g) | chlorobenzene | 2 titanations 1 h @ 110° C. | 17.1 | 4.7 | 59.6 |
| PEC#124 | MGP#175 (4.5 g) | chlorobenzene | 2 titanations 1 h @ 110° C. | 16.0 | 5.1 | 10.6 |
| PEC#125 | MGP#172 (4.6 g) | chlorobenzene | 2 titanations 1 h @ 110° C. | 16.6 | 3.9 | 63.5 |
| PEC#126 | MGP#176 (4.5 g) | chlorobenzene | 2 h @ 110° C. | 17.2 | 5.6 | 20.7 |
| PEC#127 | MGP#175 (4.6 g) | chlorobenzene | 2 h @ 110° C. | 16.6 | 6.3 | 10.0 |
| PEC#128 | MGP#175 (4.6 g) | chlorobenzene | 2 h @ 110° C. | 16.0 | 5.2 | 9.6 |
| PEC#129 | MGP#175 (4.5 g) | chlorobenzene | 2 h @ 110° C. | 16.6 | 5.5 | 10.0 |
| PEC#135 | MGP#178 (4.5 g) Tetraethoxysilane/ Ethylbenzoate as Internal donor | chlorobenzene | 2 h @ 110° C. | 15.0 | 2.3 | 11.6 |
| PEC#174 | MGP#PM-007 (6.6 g) | chlorobenzene | 2 h @ 110° C. | 17.2 | 5.8 | 11.2 |

Table 4 describes the catalyst synthesized using the same precursor and under simular conditions

TABLE 4

| Cat No | MGP# | Solvent for Dispersion | Titanation | Mg wt % | Ti wt % | D50 microns |
|---|---|---|---|---|---|---|
| PEC#156 | MGP#PM-007 (6.6 g) | chlorobenzene | 2 h @ 110° C. | 18.2 | 5.3 | 10.2 |
| PEC#160 | MGP#PM-007 (6.6 g) Ethyl benzoate as internal donor | chlorobenzene | 2 h @ 110° C. | 20.1 | 2.5 | 20.4 |

On addition of internal donor, the catalyst mean particle size (D50) increases.

Table 5 shows the above catalysts evaluation for ethylene polymerization

TABLE 5

| CATALYST | | | | POLYMERIZATION | | MFI | | POLYMER ANALYSIS | |
|---|---|---|---|---|---|---|---|---|---|
| | | | | | | | | Hexane | Bulk |
| Cat No | Cat wt (mg) | Al/Ti ratio | H2 Kg/cm$^2$ | Activity kgPE/gcat | @5 kg dg/min | MFR $I_{21.6}/I_{2.16}$ | | Solubles wt % | density g/cc |
| PEC#156 | 50.0 | 80 | 1 | 2.9 | 20.1 | 36 | | 0.3 | 0.42 |
| PEC#160 | 50.4 | 80 | 1 | 1.5 | 1.7 | ND* | | 0.2 | 0.41 |

The above table clearly shows the higher activity with better hydrogen response for the catalyst as prepared by the described process in the invention as compared to the catalyst having internal donor.

C-Ethylene Polymerization

Polymerization of ethylene was carried out in 500 ml Buchi reactor which was previously conditioned under nitrogen. The reactor was charged with 250 ml of dry hexane containing solution of 10 wt % triethylaluminum and calculated amount of solid catalyst. The reactor was pressurized with hydrogen to 14.2 psi then charged with 71 psi of ethylene under stirring at 750 rpm. The reactor was heated to and then held at 70° C. for 2 hour. At the end, the reactor was vented and the polymer was recovered at ambient conditions.

Catalyst performance and polymer properties are tabulated in Table 6.

TABLE 6

Ethylene polymerization

| CATALYST | | POLYMERIZATION | | | MFI | | POLYMER ANALYSIS | |
|---|---|---|---|---|---|---|---|---|
| | | | | | | | Hexane | Bulk |
| Cat No | Cat wt (mg) | Al/Ti ratio | H2 Kg/cm$^2$ | Activity kgPE/gcat | @5 kg dg/min | MFR $I_{21.6}/I_{2.16}$ | Solubles wt % | density g/cc |
| PEC#113 | 15.1 | 80 | 1 | 5.8 | 3.0 | 33.8 | 0.13 | 0.39 |
| | 15.2 | 80 | 2 | 3.3 | 16.4 | 35.4 | 0.92 | 0.40 |
| PEC#114 | 15.4 | 80 | 1 | 6.6 | 7.0 | 37.9 | 0.43 | 0.40 |
| | 15.3 | 80 | 2 | 4.2 | 55.7 | ND* | 1.3 | 0.40 |
| PEC#115 | 15.4 | 80 | 1 | 6.4 | 6.0 | 34.5 | 0.93 | 0.40 |
| | 15.6 | 80 | 2 | 4.2 | 47.5 | 3.6 | 0.70 | 0.40 |
| PEC#116 | 15.6 | 80 | 1 | 4.8 | 2.5 | 35.5 | 0.30 | 0.39 |
| | 15.4 | 80 | 2 | 4.4 | 50.4 | 3.5 | 1.30 | 0.40 |
| PEC#117 | 15.7 | 80 | 1 | 4.2 | 1.9 | 36.9 | 0.27 | 0.39 |
| | 15.4 | 80 | 2 | 1.4 | ND* | 11.4 | 0.54 | 0.37 |
| PEC#119 | 15.2 | 80 | 1 | 5.7 | 3.4 | 34.8 | 0.69 | 0.40 |
| PEC#122 | 15.0 | 80 | 1 | 1.5 | 0.4 | 56.7 | 0.91 | 0.32 |
| PEC#109 | 15.1 | 80 | 1 | 1.8 | ND* | 45.2 | 0.61 | 0.38 |
| PEC#123 | 15.2 | 80 | 1 | 0.4 | ND* | ND* | 0.6 | ND* |
| PEC#124 | 15.1 | 80 | 1 | 5.2 | 4.2 | 36.4 | 0.30 | 0.40 |
| PEC#125 | 15.4 | 80 | 1 | 0.5 | ND* | ND* | 0.40 | ND* |
| PEC#126 | 15.3 | 80 | 1 | 4.6 | 3.5 | 37.3 | 0.24 | 0.40 |
| PEC#127 | 15.2 | 80 | 1 | 6.3 | 7.2 | 24.9 | 0.40 | 0.40 |
| | 15.3 | 80 | 2 | 3.5 | 22.4 | 39.4 | 0.90 | 0.40 |
| PEC#135 | 25 | 80 | 1 | 1.6 | ND* | ND* | 0.06 | 0.40 |
| PEC#178 | 50.2 | 80 | 1 | 3.2 | 18.7 | ND* | 0.3 | 0.38 |

[*ND—Not Determine]

D-Hydrogen Response

Table 7 shows the hydrogen response of the said catalyst of the present invention

TABLE 7

| CATALYST | | POLYMERIZATION | | | POLYMER ANALYSIS | | |
| --- | --- | --- | --- | --- | --- | --- | --- |
| Cat No | Cat wt (mg) | Al/Ti ratio | H2 Kg/cm$^2$ | Activity kgPE/gcat | MFI @5 kg dg/min | MFR $I_{21.6}/I_{2.16}$ | Hexane Solubles wt % | Bulk density g/cc |
| PEC#174 | 50.4 | 80 | 0.5 | 2.3 | 2.8 | ND* | 0.3 | 0.39 |
|  | 50.3 | 80 | 1 | 2.2 | 19.4 | ND* | 0.4 | 0.38 |
|  | 50.4 | 80 | 1.5 | 1.7 | 64.8 | ND* | 1.2 | 0.37 |
|  | 50.0 | 80 | 2 | 1.3 | 119.5 | ND* | 1.6 | 0.37 |

The said catalyst of the present invention shows good hydrogen response as indicated above in the table. As the concentration of the hydrogen is increased, the activity of the catalyst lowers while the melt flow increases indicating that lower molecular weight polyethylene is being formed at higher hydrogen concentrations but the hexane solubles does not increase beyond 2 wt %.

E-Copolymerization

The said catalyst of the present invention was evaluated for copolymerization of ethylene with 1-butene. Table 8 describes the polymerization conditions and the polymer analysis data. The trend of the addition of the monomer was 1-butene followed by hydrogen and then ethylene. 1-butene was charged through MFC and catalyst was charged at 10° C.

TABLE 8

| CATALYST | | POLYMERIZATION | | | | POLYMER ANALYSIS | | | |
| --- | --- | --- | --- | --- | --- | --- | --- | --- | --- |
| Cat No | Cat wt (mg) | Al/Ti ratio | H2 Kg/cm$^2$ | Activity kgPolymer/gcat | 1-butene L | MFI @2.16 kg dg/min | Hexane Solubles wt % | Bulk density g/cc | $T_C$ ° C. |
| PEC#31 | 15.1 | 80 | 2 | 6.4 | 4.4 | 15.5 | 4.6 | ND | 126.7 |
|  | 15.5 | 80 | 2 | 4.6 | 2 | 18.9 | 2.2 | 0.35 | 129.7 |
|  | 15.2 | 80 | 2 | 5.1 | 3 | 28.7 | 1.3 | 0.3 | 128.8 |
|  | 15.1 | 80 | 2 | 4.6 | 1 | 23.9 | 1.6 | 0.31 | 128.7 |

*PE#237

The incorporation of 1-butene and the percentage incorporation in the copolymer was determined through $^{13}$C NMR. Table 9 describes the data.

TABLE 9

| S. No. | Br/1000 C. | Butene-1 mol % | Type of Branch |
| --- | --- | --- | --- |
| PE#237 | 12.9 | 2.7 | Ethyl |

We claim:

1. A process for preparing catalyst for the polymerization of ethylene consisting essentially of the steps of:
   contacting a magnesium based precursor with a solvent; and
   (ii) then contacting the magnesium based precursor in the solvent with a transition metal compound to obtain the catalyst,
   wherein step (ii) is single contact step; and
   wherein the magnesium based precursor is liquid or solid in nature; and
   wherein the liquid magnesium based precursor is prepared by contacting magnesium source with organohalide and alcohol in presence of the solvent in a single step; or
   wherein the solid magnesium based precursor is prepared by first contacting the magnesium source with organohalide in presence of solvating agent as the first step and then followed by addition of alcohol.

2. The process as claimed in claim 1, wherein the solvent is aromatic or aliphatic and polar or non polar in nature, and is selected from the group consisting of benzene, decane, kerosene, ethyl benzene, chlorobenzene, dichlorobenzene, toluene, o-chlorotoluene, xylene, dichloromethane, chloroform, cyclohexane and combination thereof.

3. The process as claimed in claim 1, wherein the contact time with the solvent in step (i) is immediate to 5 h.

4. The process as claimed in claim 1, wherein the contact temperature with the solvent in step (i) is from 10° C. to 200° C.

5. The process as claimed in claim 1, wherein the magnesium based precursor is contacted with solvent prior to transition metal contact.

6. The process as claimed in claim 1, wherein the transition metal compound is represented by M(OR)$_p$X$_{4-p}$, where M is selected from the group consisting of Ti, V, Zr, and Hf,; X is a halogen atom; R is a hydrocarbon group and p is an integer having value equal or less than 4, the transition metal compound is selected from the group consisting of transition metal tetrahalide, alkoxy transition metal trihalide/aryloxy transition metal trihalide, dialkoxy transition metal dihalide, trialkoxy transition metal monohalide, tetraalkoxy transition metal, and mixtures thereof; wherein:
   (a) the transition metal tetrahalide is selected from the group consisting of titanium tetrachloride, titanium tetrabromide, titanium tetraiodide vanadium tetrachloride, vanadium tetrabromide, vanadium tetraiodide, zirconium tetrachloride, zirconium tetrabromide, zirconium tetraiodide, hafnium tetrachloride, hafnium tetrabromide, and hafnium tetraiodide;
(b) alkoxy transition metal trihalide/aryloxy transition metal trihalide is selected from the group consisting of methoxytitanium trichloride, ethoxytitanium trichloride, butoxytitanium trichloride, phenoxytitanium trichloride, methoxyvanadium trichloride, ethoxyvanadium trichloride, butoxyvanadium trichloride, phenoxyvanadium trichloride, methoxyzirconium trichloride, ethoxyzirconium trichloride, butoxyzirconium trichloride, phenoxyzirconium trichloride, methoxyhafnium trichloride, ethoxyhafnium trichloride, butoxyhafnium trichloride, and phenoxyhafnium trichloride;
(c) dialkoxy transition metal dihalide is selected from the group consisting of diethoxy titanium dichloride, diethoxy vanadium dichloride, diethoxydiethoxy zirconium dichloride, and diethoxydiethoxy hafnium dichloride;
(d) trialkoxy transition metal monohalide is selected from the group consisting of triethoxy titanium chloride, triethoxy vanadium chloride, triethoxy zirconium chloride, and triethoxy hafnium chloride; and
(e) tetraalkoxy transition metal is selected from the group consisting of tetrabutoxy titanium, tetraethoxy titanium, tetrabutoxy vanadium, tetraethoxy vanadium, tetrabutoxy zirconium, tetraethoxy zirconium, tetrabutoxy hafnium, and tetraethoxy hafnium.

7. The process as claimed in claim 1, wherein the contact temperature with the transition metal compound in step (ii) is between −50° C. and 150° C.

8. The process as claimed in claim 1, wherein the transition metal compound is a titanium compound and added in amounts ranging from 1 to 20 moles with respect to one mole of magnesium.

9. The process as claimed in claim 1, wherein the transition metal compound is used either neat or in solvent and wherein the solvent is selected from the group consisting of chlorinated aromatic hydrocarbon, non chlorinated aromatic hydrocarbon, chlorinated aliphatic hydrocarbon, non chlorinated aliphatic hydrocarbon and combination thereof.

10. The process as claimed in claim 9, wherein the solvent comprises from 40 to 60 volume percent and selected from the group consisting of benzene, decane, kerosene, ethyl benzene, chlorobenzene, dichlorobenzene, toluene, o-chlorotoluene, xylene, dichloromethane, chloroform, cyclohexane and combination thereof.

11. The process as claimed in claim 1, wherein the contact temperature with the transition metal compound in step (ii) is between −50° C. and 150° C. and heating is instigated at a rate of 0.1 to 10.0° C./minute.

* * * * *